N. MATTHEWS.
BEEHIVE.
APPLICATION FILED JUNE 16, 1913.
1,080,152.
Patented Dec. 2, 1913.
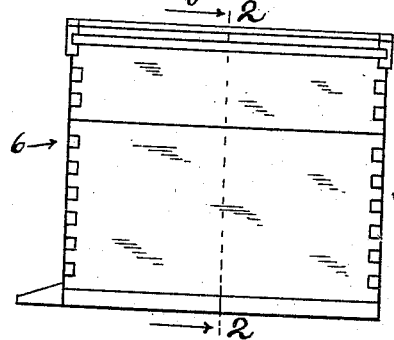
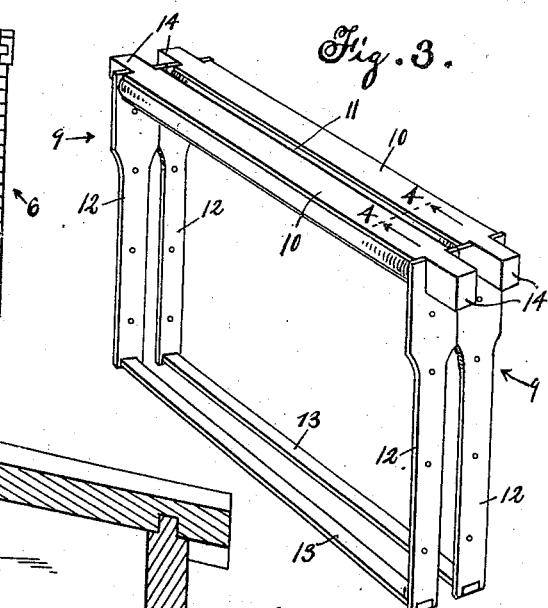
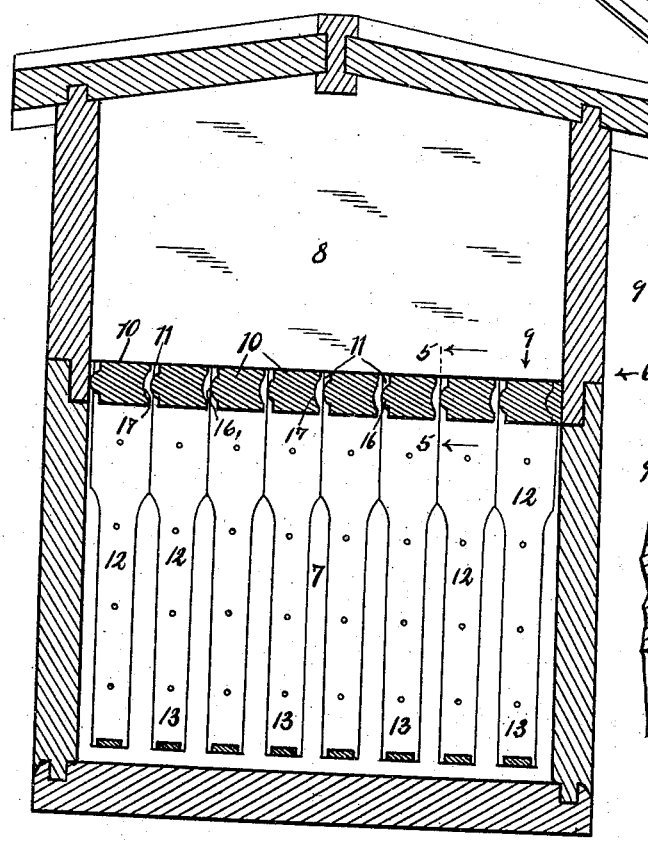
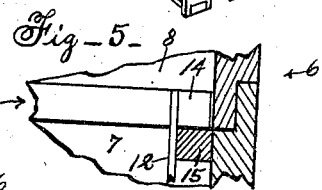
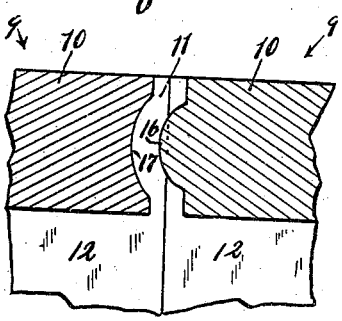
WITNESSES:
INVENTOR.
Newton Matthews
By
ATTORNEY.

UNITED STATES PATENT OFFICE.

NEWTON MATTHEWS, OF FULLERTON, CALIFORNIA.

BEEHIVE.

1,080,152. Specification of Letters Patent. Patented Dec. 2, 1913.

Application filed June 16, 1913. Serial No. 774,041.

*To all whom it may concern:*

Be it known that I, NEWTON MATTHEWS, a citizen of the United States of America, residing at Fullerton, county of Orange, State of California, have invented a certain new and useful Beehive; and I do hereby declare the following to be a full, clear, and exact description of the invention, such as will enable others skilled in the art to which it appertains to make and use the same.

This invention relates to a bee-hive; more particularly to the novel and improved construction of the top bars of the brood frames in the bee hive, whereby a queen bee is prevented from passing from the brood chamber to the surplus chambers of the bee hive.

For well known reasons it is a desideratum that queen bees be excluded from the chambers above the brood chamber in a bee hive. Devices heretofore devised and used for preventing the passage of queen bees from the brood chamber to the other chambers of the bee hive are separate from the brood frames and are not altogether satisfactory in that they are comparatively expensive, easily lost or damaged, liable to deposits of brace comb and propolis, and troublesome in use.

The main object of the invention is to provide between the top bars of the brood frames, tortuous passageways which prevent queen bees going through said passageways to a chamber adjacent to the brood chamber in a bee hive.

A further object of the invention is to provide on the brood frames novel and improved queen excluding means which is simple and yet effective in character, easy and economical to make, use, and install, strong and durable, and which in practice has been found to be subject to minimum deposits of brace comb and propolis.

Other objects and the advantages of the invention will be apparent to those skilled in the art from a consideration of the following description of the preferred form of construction embodying it, taken in connection with the accompanying drawings in which Figure 1 is a side elevational view of a bee hive; Fig. 2 is an enlarged sectional view taken on the line 2—2 of Fig. 1; Fig. 3 is a perspective view of two of the brood frames; Fig. 4 is an enlarged broken and sectional view taken on the line 4—4 of Fig. 3; and Fig. 5 is a partly broken and sectional view taken on the line 5—5 of Fig. 2.

The bee hive 6 may be of any suitable or approved construction and in this instance is provided with a lower or brood chamber 7 and with an upper or surplus chamber 8. In the chamber 7 are arranged a plurality of brood frames 9 having sides of the top bars 10 thereof formed to provide tortuous passageways 11 between and leading from the lower to the upper surfaces of the top bars 10. As shown, the brood frames 9 preferably consist of the top bars 10, the end bars 12, and the bars 13 connected between the lower ends of the bars 12. The end portions 14 of the top bars 10 are preferably of reduced width and disposed in notches in the upper ends of the bars 12, and they are adapted to rest on ledges 15 to support the frames 9 in the brood chamber 7. The upper end portion of the end bars 12 are preferably made of sufficient width to automatically space the top bars 10 at an equal distance from each other when the frames 9 are placed together in the brood chamber 7.

The passageways 11 while permitting free movement of the working bees therethrough are adapted, as has been found in practice, to prevent a queen bee from passing therethrough to go from the brood chamber 7 to the surplus chamber 8. To form the passageways 11, the top bars 10 are each formed with a preferably curved projection or convexity 16 on one side thereof and a preferably curved cavity or concavity 17 on the other side thereof and the top bars are arranged to have the convexities 16 facing the concavities 17.

It will be seen that the invention has the merit of being simple in character. In practice it has been found to effectively exclude queen bees from the surplus chamber and to accomplish the objects hereinbefore mentioned.

I claim:

1. In a bee hive, brood frames having the top bars thereof spaced from each other and formed to provide a tortuous passageway between the sides of adjacent top bars, substantially as and for the purpose set forth.

2. In a bee hive, brood frames having the top bars thereof formed and arranged to provide tortuous passageways between the lower and the upper surfaces of the top bars, substantially as set forth.

3. In a bee hive, brood frames having the top bars thereof formed with a curved projection on one side thereof and a cavity on the other side thereof and arranged spaced from each other to provide between the top bars passageways which lead from the lower to the upper surfaces of the top bars and are adapted to prevent a queen bee from passing therethrough, substantially as described.

In testimony whereof, I have signed my name to this specification in the presence of two subscribing witnesses at Fullerton, county of Orange, State of California, this 10th day of June A. D. 1913.

NEWTON MATTHEWS.

Witnesses:
E. I. FULLER,
J. L. SCHMACHER.

Copies of this patent may be obtained for five cents each, by addressing the "Commissioner of Patents, Washington, D. C."